Sept. 11, 1945.  E. WILDHABER  2,384,583
FACE CLUTCH
Filed Nov. 17, 1942   4 Sheets-Sheet 1

Inventor
ERNEST WILDHABER
By
*[signature]*
Attorney

Sept. 11, 1945.  E. WILDHABER  2,384,583
FACE CLUTCH
Filed Nov. 17, 1942  4 Sheets-Sheet 2

Inventor
ERNEST WILDHABER
By
Attorney

Inventor
ERNEST WILDHABER.

Sept. 11, 1945.  E. WILDHABER  2,384,583
FACE CLUTCH
Filed Nov. 17, 1942  4 Sheets-Sheet 4

Inventor
ERNEST WILDHABER
By
Attorney

Patented Sept. 11, 1945

2,384,583

UNITED STATES PATENT OFFICE 2,384,583

FACE CLUTCH

Ernest Wildhaber, Brighton, N. Y., assignor to Gleason Works, Rochester, N. Y., a corporation of New York Application November 17, 1942, Serial No. 465,862

25 Claims. (Cl. 192—67)

The present invention relates to toothed face clutches and to methods of producing such clutches. In a more particular aspect, the invention relates to the construction and production of clash-type toothed face clutch members whose teeth are chamfered at their tops to facilitate engagement of the clutch members while in motion. The present application covers the novel clutch of the present invention. The new method of producing clutches is covered in a separate application, Serial No. 582,637, filed March 14, 1945, as a division of the present application.

In a clash-type face clutch, the chamfered parts of the teeth have to carry loads at the beginning of engagement of the clutch members when teeth and tooth spaces of the two clutch members are not in exact register. These loads are high, shock loads. It is important, therefore, that the teeth of clash-type face clutches be so chamfered that the chamfered portions as well as the main portions of the teeth can stand and carry heavy loads.

Toothed face clutches ordinarily have radially arranged teeth and often are provided with chamfer surfaces which extend parallel to the tooth sides. Such chamfered surfaces, however, will not carry heavy loads. The reason is that while the sides of the clutch teeth themselves are radial of the clutch axis, the chamfered portions of the teeth are not, for the line elements of the chamfered portions are parallel to the sides of the teeth and are, therefore, offset from the clutch axis. The chamfered portions of the teeth of mating clutch members made in the known way will, therefore, contact only at the outer ends of the clutch teeth, instead of midway of the tooth lengths or along the whole of the tooth lengths. Hence, at the beginning of engagement, the loads will be concentrated on the outer ends of the clutch teeth, and the load-carrying capacity of the clutch members will, accordingly, be severely limited.

A primary object of the present invention is to provide a toothed face clutch which will have correct tooth chamfer and be capable of carrying heavy loads even when only the chamfered portions of the mating clutch members are in contact.

Another object of the invention is to provide an improved type of chamfer surface for toothed face clutches which can be approximated by a surface of revolution and which can be applied in a form cut.

A further object of the invention is to provide a new type of chamfer surface for toothed face clutches of such form that the contact between the chamfered portions of the teeth of mating clutch members will be localized at mean points in the length of the clutch teeth and away from the tooth ends.

Another object of the invention is to provide a suitable type of chamfer which can be applied on one or both members of a clutch pair simultaneously with the cutting or grinding of the sides of the teeth of a clutch member.

A further object of the invention is to provide a process for cutting and chamfering opposite sides of the teeth of a clutch member in a single operation.

Another object of the invention is to provide a process for cutting and chamfering opposite sides and opposite top edges of the teeth of a clutch member in a single operation as counterparts of cutting and chamfering surfaces of a suitable tool, particularly of a face mill cutter.

Other objects of the invention will be apparent hereinafter from the specification and from the recital of the appended claims.

The first and main requirement for suitable chamfer in a toothed face clutch is that the mating chamfered portions of engaging clutch members be so shaped as to contact at mean points in the lengths of said chamfered portions. This may be fulfilled when mating chamfered portions of the teeth of the engaging clutch members have the same lengthwise direction at mean points in a plane perpendicular to the clutch axis. Secondly, it is desirable that these conditions of contact be fulfilled not only at a mean point in the length of the chamfered part of a tooth, but at other points in the considered plane as well. Thirdly, it is desirable that the contact between the chamfered portions of the engaging clutch members extend lengthwise of the teeth for a sufficient distance to carry the loads, but preferably not to the ends of the teeth.

Toothed face clutch members constructed according to the present invention are made with longitudinally curved side tooth surfaces and longitudinally curved chamfered portions. The sides of the teeth are parts of surfaces of revolution, and the chamfered portions of at least one member of the clutch pair are made surfaces of revolution coaxial with side surfaces of the teeth of said clutch member. Preferably, opposite sides of spaced teeth of each member of a clutch pair are made parts of a common surface of revolution. One member may have the opposite sides of spaced teeth parts of a common convex surface of revolution, while the other member may have the opposite sides of spaced teeth parts of a common concave surface of revolution, or both members may have the opposite sides of spaced teeth parts of common convex surfaces of revolution. The chamfered portions at opposite sides of spaced teeth are also preferably made parts of a common surface of revolution. One or both members may have chamfered surfaces which are parts of surfaces of revolution which are coaxial with the sides of the teeth or one member may have chamfered surfaces which are coaxial with its side surfaces and the other member may have chamfered surfaces whose axes are inclined to the sides of its teeth. The chamfered parts of longitudinally convex tooth sides may be made longitudinally convex, or longitudinally concave, and vice versa, the chamfered parts of longitudinally concave tooth sides may be made either longitudinally concave or longitudinally convex. In all cases, the chamfered portions of mating teeth are made to extend in the same lengthwise direction, preferably radial of the clutch axis, at points of contact, and the side surfaces of mating teeth are also made to extend in the same lengthwise direction, preferably radial of the clutch axis, at points of contact.

The tooth sides may be cut simultaneously with the chamfering of the teeth, or side-cutting and chamfering may be effected in separate operations. Preferably the tooth sides and chamfers of at least one member of a clutch pair are cut simultaneously.

In the cutting operation, a face mill cutter is preferably employed that is of sufficiently large diameter to operate simultaneously in two spaced tooth zones of the work. This is true, whether it is the tooth sides that are to be cut or the chamfers that are to be produced. In any case, in order to obtain the desired lengthwise direction of the tooth sides or of the chamfers, the cutter employed must be positioned so that its axis lies in a plane containing the clutch axis and intersects normals at mean points to the side and chamfered portions of a clutch tooth. The cutter is rotated in engagement with the work while a relative depthwise feed movement is produced between the cutter and the work. When the opposite sides of spaced teeth have been cut to full depth, the cutter is withdrawn, and the blank indexed. Then the cycle begins anew. Thus, side tooth surfaces and chamfer surfaces are cut on the clutch member which are counterparts of the cutting tool or tools and which extend in the desired direction.

The depthwise feed motion is preferably effected in a direction inclined to the axis of the cutter so that cutting will be done by the tip cutting edges and the side-cutting edges at one side only of the cutter, even when cutting from the solid, and the other side of the cutter will be relieved of cutting. This permits of sharpening the cutter blades so as to have side-cutting edges at one side only. This type of cutter is particularly advantageous because it produces a fine finish.

By using a face mill cutter that has side-cutting edges at one side that are shaped for part of their height to produce the desired profile shapes on the sides of the teeth of the gear, and that have the rest of their heights shaped to produce the desired chamfer, side surfaces and chamfer surfaces can be produced simultaneously. They will either be both longitudinally convex or both longitudinally concave, depending on whether the cutting and chamfering edges are both inside or both outside cutting edges. By using a face mill cutter that has side-cutting edges at one side shaped to produce the desired profile shapes on the sides of the teeth of the gear, and chamfering edges at its opposite side that are shaped to produce the desired chamfers, sides of teeth or tooth spaces can be cut and opposite sides of those teeth or tooth spaces chamfered in the same operation. If the side-cutting edges are inside cutting edges and the chamfering edges are outside cutting edges, the tooth sides will be longitudinally convex and the chamfers will be longitudinally concave, while if the side-cutting edges are outside cutting edges and the chamfering edges are inside cutting edges, the tooth sides will be longitudinally concave and the chamfers will be longitudinally convex.

Several different embodiments of the invention are illustrated in the accompanying drawings, in which.

Figure 1:
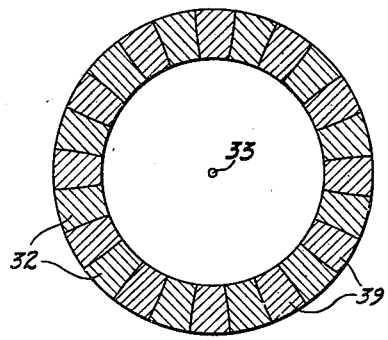
Fig. 1 is a sectional view of a pair of engaging toothed face clutch members made according to one embodiment of this invention, the section being taken in a mean plane, hereinafter referred to as the pitch plane, which is perpendicular to the clutch axis.
Figure 2:
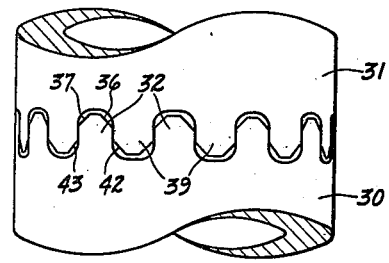
Fig. 2 is a fragmentary elevational view of the pair of clutch members.

Reference will be made first to the embodiment of the invention illustrated in Figs. 1 to 6 inclusive. Here 30 and 31 denote, respectively, the two members of a clutch pair. The member 30 has teeth 32 which extend generally radially of the clutch axis 33 and whose opposite sides 34 and 35 are longitudinally concave. The mating clutch member 31 has teeth 39 which extend generally radially of the clutch axis 33 and whose opposite sides 40 and 41 are longitudinally convex. The teeth 32 of member 30 are chamfered along their top edges on both sides, as denoted at 36 and 37. In the instance shown, the chamfered portions 36 and 37 of the teeth extend generally radially of the clutch axis 33 and are of concave lengthwise shape like the tooth sides 34 and 35. The teeth 39 of member 31 are chamfered along their top edges on both sides, as denoted at 42 and 43, and in the embodiment shown, the chamfered portions 42 and 43 extend generally radially of the clutch axis 33 and are of convex lengthwise curvature like the tooth sides 40 and 41. In the instance illustrated, the opposite sides of the teeth of both clutch members are of zero pressure angle, that is, their profiles extend in the direction of the clutch axis 33. They may be made, however, of any desired pressure angle.

For cutting the teeth 32 of the clutch member 30, a face mill cutter 55 is used whose blades 59 have outside cutting edges 56 and outside chamfering edges 54. The side-cutting edges 56 are of positive pressure angle and extend for part only of the effective cutting height of the cutter, while the chamfering edges 54 extend for the rest of the effective cutting height of the cutter and are of greater positive pressure angle than the side-cutting edges 56. The chamfering edges 54 may be formed on the same blades 59 of the cutter as the side-cutting edges 56, or they may be formed on separate blades so that one blade may cut on the sides of the teeth of the work and another blade may chamfer the teeth along their top edges.

The cutter 55 is tilted with reference to the clutch blank so that its axis 46 intersects the clutch axis 33 and is inclined to the pitch plane 47 of the clutch member at an angle substantially equal to the pressure angle of the outside cutting edges 56 of the cutter so as to produce tooth sides of zero pressure angle on the clutch. The diameter of the cutter 55 is preferably so chosen that it will cut and chamfer opposite sides of spaced teeth of the clutch member in a single operation as, for instance, the opposite sides 34a and 35b of teeth 32a and 32b and the chamfered portions 36a and 37b of these same teeth.

As already stated, the side surfaces of the teeth of clutch member 30 have a radial direction at mean points in their lengths, such as at point 57 of tooth side 35b. Hence, the normal 58 to a tooth side 35b at mean point 57 is perpendicular to the mean radius 33—57 (Fig. 3) of the clutch member. As also previously explained, the chamfered portions of the teeth of clutch member 30 also have a radial direction at mean points in their lengths, such as at point 60 of chamfered surface 37b. Hence, the normal 62 at said mean point 60 is perpendicular to the radius 33—60 of the clutch member at said mean point.

Normal 62 intersects the plane of symmetry 63 containing the axes 33 and 46 of work and cutter in a point 64, and normal 58 intersects said plane of symmetry in point 65. To secure chamfered surfaces which extend generally radially of the clutch axis as well as side tooth surfaces which extend generally radially of the clutch axis, the cutter axis 46 should be positioned to pass through point 65 as well as through point 64, and the chamfering edge 54 should be perpendicular to the normal 62 at least at mean point 60. In this way, the chamfer is correctly positioned even though chamfered portions and tooth sides are parts of concentric surfaces of revolution and may be simultaneously cut.

In the cutting operation, the cutter 55 is rotated on its axis 46 in engagement with the clutch blank while the clutch blank is held stationary on its axis 33, and while simultaneously a relative depthwise feed movement is produced between the clutch member and the cutter. When the opposite sides of two spaced teeth as, for instance, the sides 34a and 35b and the chamfered portions 36a and 37b of the spaced teeth 32a and 32b have been cut to full depth and chamfered, the cutter is withdrawn from engagement with the blank, and the blank indexed. Then the cycle begins anew and is repeated until all of the tooth sides have been cut and chamfered.

The feed movement may be in the direction of the cutter axis, but preferably is in a direction inclined to both the cutter and clutch axes so that the inside edges of the cutter blades will do no cutting. All of the blades of the cutter can then be sharpened to be outside cutting blades. Otherwise, alternate blades of the cutter have to be inside and outside blades. In any case, the final shape is applied to the work when the cutter is in full depth position. The feed may be imparted either to the work or to the cutter. The arrow 66 in Fig. 4 indicates the feed direction when the feed is imparted to the work.

The cutting of the side tooth surfaces of the clutch member 31 is effected in a manner similar to the cutting of the side tooth surfaces of the clutch member 30. A face-mill cutter 70 is used which has a plurality of annularly arranged cutting blades 71 that have inside cutting edges 72 for cutting the sides of the teeth and inside chamfering edges 73 for chamfering the teeth along their top edges. The side-cutting edges 72 are of straight profile and the chamfering edges 73 are also of straight profile, but of greater pressure angle than the side-cutting edges 72. The cutter 70 is again of large enough diameter to operate simultaneously in two spaced tooth zones of the work and is again tilted to produce tooth sides of the desired pressure angle on the work, in this case, zero pressure angle.

Normal 75 to a tooth side 41b of clutch member 31 at mean point 76 in the tooth length is perpendicular to the mean clutch radius 33—76 because the side surfaces of the teeth extend radially of the clutch axis. This normal intersects the symmetrical plane 77 containing cutter axis 51 and clutch axis 33 in point 78. Normal 79 at mean point 80 of the chamfered surface 43b is perpendicular to the radius 33—80 and intersects the plane 77 of symmetry in a point 81. To cut the side tooth surfaces and chamfered portions simultaneously, then, the cutter axis 51 must pass through both the point 78 and the point 81, and the cutter must be positioned so that inside cutting edge 72 is perpendicular to normal 75 at point 76, and chamfering edge 73 is perpendicular to normal 79 at the point corresponding to the point 80.

The cutting and chamfering of the teeth of the clutch member 31 is effected by rotating the cutter 70 on its axis 51 while producing a relative depthwise feed movement between the cutter and the work again preferably in a direction inclined to the axes of both cutter and work, such as the direction 84. When the opposite sides of two spaced teeth of the clutch member 31 have been cut and chamfered, the cutter is withdrawn from engagement with the work, and the work indexed. Then the cycle begins anew. Again, the tooth shapes produced are counterparts of the cutting surfaces and finished tooth shape is attained at full depth position.

Figure 3:
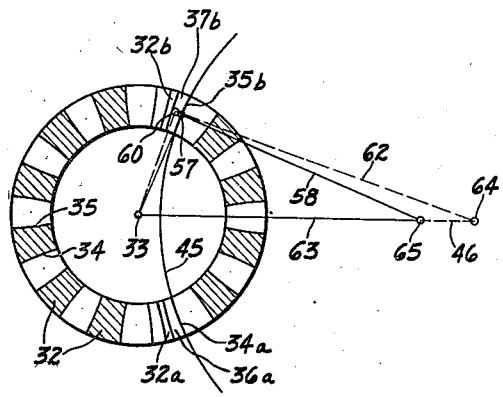
Fig. 3 is a diagrammatic view, showing one of the clutch members, partly in section in the pitch plane and partly in plan, and illustrating the principles underlying the cutting and chamfering of the tooth surfaces of this member.

It is to be noted that the distance 76—78 between mean point 76 and the point of intersection of normal 75 with the plane of symmetry 77 (Fig. 5) is equal to distance 58 between mean point 57 and the point of intersection of normal 56 with the plane of symmetry 63 (Fig. 3). Hence, the contacting sides of the two clutch members 30 and 31 will match each other along their full length. If less than full length engagement is desired, a smaller cutter may be used in the cutting of the clutch member 31, or two clutch members having tooth sides of convex lengthwise shape like the member 30 may be meshed together.

It should be noted that the inside cutting edges 72 of cutter 70 have a negative pressure angle, that is, they are inclined away from the cutter axis 51. The cutter 70 must, therefore, be relieved radially as well as axially. This means that the blades of the cutter will have to be adjusted radially after sharpening, but this may be accomplished readily by adjustment of the wedges 85 which are commonly provided for radial adjustment of face mill cutter blades. It should be noted further that while the side-cutting edges and the chamfering edges of both cutter 55 and cutter 70 are of straight profile shape, they may be made of any suitable or desired profile shape. In fact, as will be explained further hereinafter it is advantageous to make the chamfering edges of concave profile shape to produce chamfer surfaces of convex profile.

The outside surface 86 of each cutter blade 71 of cutter 70 (Fig. 6) may have, as shown, a straight profile parallel to the direction of relief of the inside cutting blades. In such case, the outside surfaces of all of the cutter blades may then be ground as parts of a single conical surface concentric with the cutter axis 51. These are non-cutting edges and do not require any relief. Likewise, the inside surfaces 53 of the blades 59 (Fig. 4) of cutter 55 do not require any relief, and since the outside edges of this cutter are axially relieved, in the ordinary manner, the inside surfaces may be shaped to extend in the direction of the cutter axis 46 and may, accordingly, be made parts of a cylindrical surface concentric with the cutter axis.

From the method of cutting the clutch members 30 and 31, it will be seen that opposite sides of spaced teeth of each clutch member lie in a common surface of revolution, and the chamfered portions of opposite sides of spaced teeth also lie in a common surface of revolution. Moreover, the chamfered portions at opposite sides of spaced teeth of each clutch member are surfaces of revolution coaxial with the side tooth surfaces themselves. Thus, the opposite sides 34a and 35b, respectively, of spaced teeth 32a and 32b of clutch member 30 lie in a common conical surface, denoted in Fig. 3 by the line 45, whose axis coincides with axis 46 of cutter 55 and is inclined to pitch plane 47 of the clutch member, while the chamfered portions 36a and 37b of the same tooth sides are portions of a conical surface whose axis is also at 46. Likewise, opposite sides 40a and 41b of spaced teeth 39a and 39b of clutch member 31 are parts of a common conical surface, denoted by the circular arc 50 (Fig. 5), whose axis coincides with axis 51 of cutter 70 and is inclined to the pitch line 52 of the clutch member, while the chamfered portions 42a and 43b at these sides of the teeth 39a and 39b are parts of a common conical surface whose axis is also at 51. Teeth 32a and 32b of clutch member 30 and teeth 39a and 39b of clutch member 31 are shown in plan in Figs. 3 and 5, respectively.

Clutch members 30 and 31 are preferably provided with plane top surfaces perpendicular to the clutch axis 33 as denoted at 90 and 91, respectively, but each clutch member has a slightly tapering root line or tooth space bottom 92 and 93, respectively, because of the tilt of the cutter in the cutting of each member. The chamfered portions of the teeth of the two clutch members are parallel to the root lines 92 and 93 respectively, and increase in width from the insides of the teeth to the outsides thereof.

Figure 7:
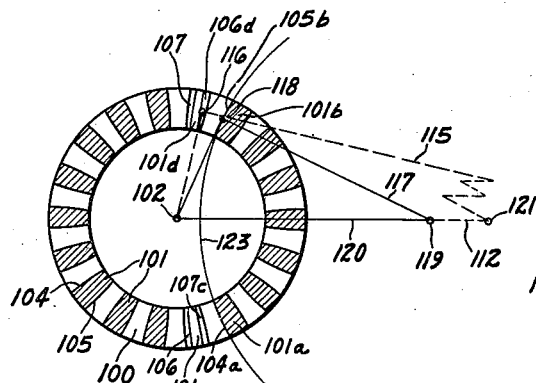
Figs. 7 and 8 are views similar to Figs. 5 and 6, respectively, showing how the tooth surfaces of one member of a clutch pair may be cut and chamfered simultaneously according to a different clutch member according to this invention.
Figure 8:
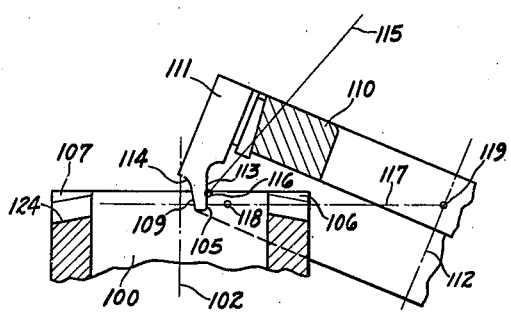

A modified form of clutch member and a modified method of producing a clutch member according to this invention is illustrated in Figs. 7 and 8. Here a clutch member 100 is shown that has teeth 101 extending generally radially of its axis 102. The opposite sides 104 and 105 of the teeth 101 are of straight profile shape and zero pressure angle and they are longitudinally convex. The chamfered portions 106 and 107 of opposite tooth sides are of convex profile shape and of longitudinally concave lengthwise shape. Two teeth 101c and 101d are shown in plan in Fig. 7.

A face mill cutter 110 is used for cutting this clutch member 100. This cutter has a plurality of cutting blades 111 arranged circularly about its axis 112. The blades 111 have inside cutting edges 113 of straight profile and negative pressure angle, for cutting the side surfaces 104 and 105 of the clutch teeth, and outside cutting edges 114 of concave circular arcuate shape, for chamfering the clutch teeth. The cutter is of sufficient diameter to operate simultaneously in two spaced tooth zones of the work.

The determination of the cutter position and the shape of its cutting edges is based on the same principles as previously described. Normal 115 at a mean point 116 in the chamfered portion of a tooth is perpendicular to the radius 102—116 and likewise normal 117 at a mean point 118 in a tooth side is perpendicular to the clutch radius 101—118. Moreover, the cutter axis 112 should pass through the intersection point 119 of normal 117 with the plane of symmetry 120 containing the work and cutter axes, and through the intersection point 121 of the normal 115 with said plane. The inside edges 113 are inclined to the cutter axis 112 at the angle required in order for the inside edges to cut tooth surfaces of zero pressure angle on the work.

In operation, the cutter is rotated on its axis in engagement with the work, while the work is held stationary on its axis and while a relative depth-wise feed movement is effected between the cutter and the work, preferably in a direction inclined to the axes of both the cutter and the work. When a pair of tooth surfaces of the work have been cut and chamfered, the cutter is withdrawn from engagement with the work and the work is indexed. Then the cycle begins anew.

In this embodiment of the invention, the side cutting edges 113 of the cutter operate on one side of a tooth space and the chamfering edges 114 operate simultaneously on the opposite side of the tooth space. Thus the side-cutting edges 113 cut the opposite sides 104a and 105b of spaced teeth 101a and 101b, respectively, of the clutch member while the chamfering edges 114 are chamfering the teeth 101c and 101d at opposite sides thereof, respectively, to produce the chamfer surfaces 107c and 106d. Hence, the chamfer surface at one side of a tooth space will be cut as a surface of revolution of convex profile shape coaxial with the conical surface of revolution containing the side surface at the opposite side of that tooth space. In fact, chamfer surfaces at opposite sides of spaced tooth spaces as, for instance, the chamfer surfaces 107c and 106d, will be parts of convex surfaces of revolution coaxial with the conical surface of revolution containing the opposite sides 104a and 105b, respectively, of these same two tooth spaces. The axis of these surfaces of revolution coincides with cutter axis 112. 123 denotes the path traced by a point in the side cutting edge 113 of a blade 111 of the cutter, or also the line of intersection with the pitch plane of the conical surface containing the tooth sides 104a and 105b.

In this embodiment of the invention, tooth spaces and teeth of tapering depth are cut which have a greater taper in height from their inner to their outer ends than do the teeth and tooth spaces in the previously described embodiment of the invention. The bottoms or root lines of the tooth spaces of clutch member 100 are denoted at 124. The increase in depthwise taper is sometimes desirable, however, especially where concave chamfering portions 114 are used in order to obtain a long enough bearing area on the mating chamfered portions 106 and 107 of the clutch teeth.

Figure 9:
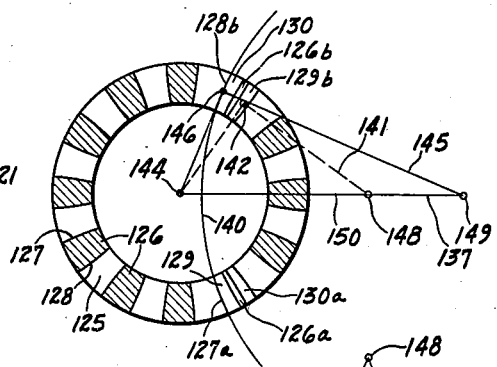
Figs. 9 and 10 are views similar to Figs. 5 and 6, respectively, illustrating the simultaneously cutting and chamfering of the tooth surfaces of a clutch member according to a further embodiment of the present invention.
Figure 10:
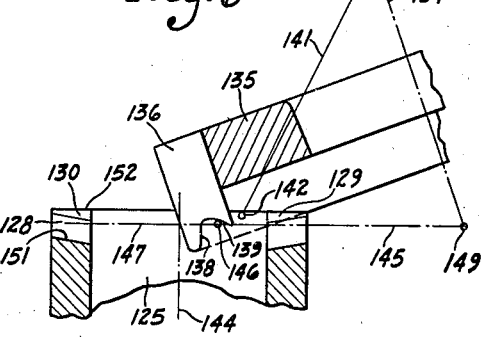

A still further embodiment of the invention is illustrated in Figs. 9 and 10. Here a clutch member 125 is shown that has teeth 126 whose opposite side surfaces 127 and 128 are longitudinally convex and whose opposite chamfered portions 129 and 130 are longitudinally concave.

The clutch member 125 is cut with a face mill cutter 135 which has a plurality of cutting blades 136 that are arranged circularly about its axis 137. These cutting blades have inside cutting edges 138 of positive pressure angle and concave chamfering edges 139 that are also of positive pressure angle but of considerably greater pressure angle than the side-cutting edges 138. The concave chamfering edges 139 are so arranged as to operate on the opposite sides of the clutch teeth from those being operated on by the side cutting edges 138. Hence, one side of a clutch tooth is cut and the opposite side of that tooth chamfered in the same operation. The diameter of the cutter is preferably chosen, as in the previous embodiments of the invention, so as to operate in two spaced tooth zones of the work simultaneously. Thus, the opposite sides 127a and 128b of spaced teeth 126a and 126b may be cut and the portions 130a and 129b of these same teeth chamfered in a single operation. The path of movement of a point in the side cutting edge 138 of a blade of cutter 135 at full depth position is denoted by the arc 140 in Fig. 9.

The same principles are followed in determining the shape and position of the cutter 135 for cutting clutch member 125 as have been described with reference to the previously mentioned embodiments of the invention. Again the normal 141 at a mean point 142 in the portion 129b is perpendicular to a line 144—142 drawn radially of the clutch axis 144 to the mean point 142. Again the line 145 normal to a tooth side 128b at a mean point 146 in the length of this tooth side is perpendicular to the line 144—146 radial of the clutch axis 144. Again the cutting edge 138 at mean point 146 should be perpendicular to normal 145 which lies in the pitch plane 147 (Fig. 10) if outside tooth surfaces of zero pressure angle are to be cut on the work. Again, chamfering edge 139 should be perpendicular to normal 141. Again, the cutter axis 137 must be so positioned as to pass through the points 148 and 149 of intersection of the normals 141 and 145, respectively, with the plane of symmetry 150 containing the clutch and cutter axes.

Instead of forming the side cutting edge 138 and chamfering edge 139 on the same blade, these edges may be provided on separate blades. Since both edges are of positive pressure angle, the blades can be axially relieved in the conventional manner and no adjustment of the blades is necessary after sharpening, but change of position of the cutting edges after sharpening can be compensated for simply by a single axial adjustment of the cutter.

An interesting feature of the embodiment of the invention illustrated in Figs. 9 and 10 is the reversal of the tooth taper. The cutter 135 is tilted outwardly away from the work, whereas in the previously described embodiments of the invention the cutter is tilted inwardly into the work. Hence, the root line or tooth bottom 151 of clutch member 125 is inclined downwardly from the outer to the inner ends of the clutch teeth. This means that the teeth will increase in height from their outer to their inner ends if the clutch is provided with a plane top surface as denoted at 152 in Fig. 10. To obtain uniform tooth height, or more nearly uniform tooth height, from end to end of the teeth, the top surface of the clutch member may be made an internal conical surface.

Figure 4:
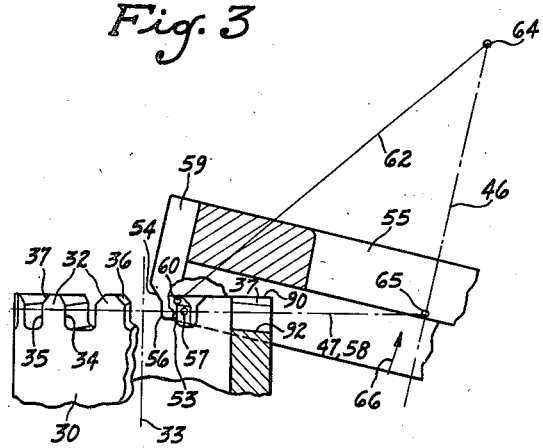
Fig. 4 is a part elevational, part sectional view, further illustrating one method of simultaneously cutting and chamfering tooth surfaces of this clutch member according to the present invention.
Figure 6:
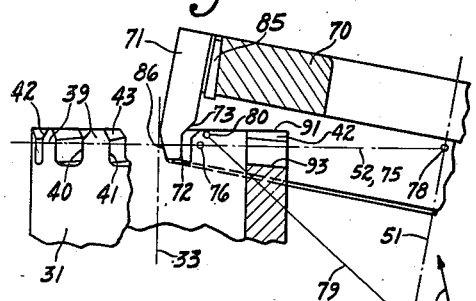

A clutch member made like the clutch member 100 of Figs. 7 and 8 or like the clutch member 125 of Figs. 9 and 10 can be mated with a clutch member produced like the clutch member 30 of Figs. 3 and 4, provided that the clutch member 30 has a chamfer surface of convex profile shape produced with a concave cutting edge.

Figure 11:
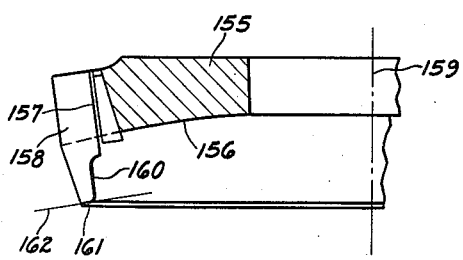
Fig. 11 is a fragmentary axial sectional view of a preferred form of face mill cutter with inside cutting blades made to practice this invention.

A face mill cutter 155 is shown in Fig. 11 of a type that may be employed advantageously in practicing this invention. It has a concave, somewhat saucer-like front face 156 which provides greater clearance between the cutter and the work than a plane front face. The slots 157 in the cutter head for the blades 158 are substantially perpendicular to the concave front face 156 of the cutter and are inclined to the cutter axis 159. The tip cutting edges 161 of the blades are also inclined to the axis 159 of the cutter and lie in a conical surface 162 coaxial with the cutter. Where the cutting blades have side cutting edges of zero or negative pressure angle as indicated at 160 in Fig. 11, the shape of the cutter blades is very much simplified by use of a cutter head such as shown at 155.

Figure 12:
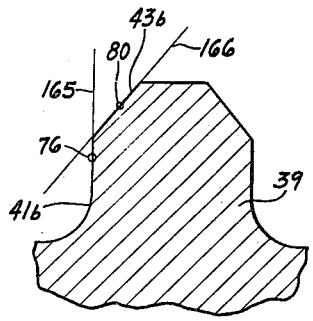
Fig. 12 is a normal section through a tooth of a clutch member made according to the embodiment of the invention illustrated in Figs. 3 and 4.

The use and advantage of concave chamfering edges, that is, of convex chamfered portions on the teeth of engaging clutch members will be described further with reference to Figs. 12 to 14 inclusive. Fig. 12 is an enlarged sectional view of a tooth 39 of the clutch member 31 taken parallel to the clutch axis and in a plane containing the normal 75 (Fig. 5). 165 denotes the straight tooth profile or a profile tangent to the tooth side 41b at a mean point 76 in that tooth side, while 166 denotes a profile tangent to the chamfered portion 43b of the tooth at the mean point 80 in the chamfered portion. The tooth side 41b is of zero pressure angle. Hence, the tangent 165 extends in the direction of the clutch axis. The chamfered portion 43b is inclined to the tooth side 41b and to a plane 167 (Fig. 13) perpendicular to the clutch axis.

Figure 5:
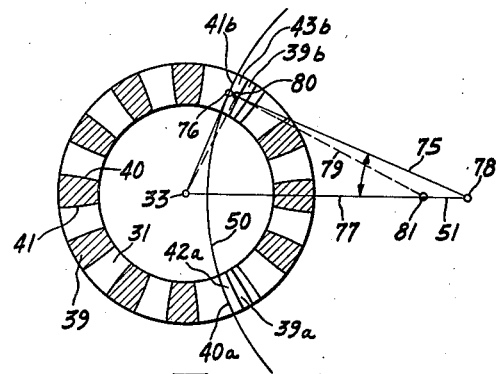
Figs. 5 and 6 are views similar to Figs. 3 and 4, respectively, showing one method of simultaneously cutting and chamfering teeth of the mating clutch member according to this invention.

In the drawings, the angle between the tangent 166 and the plane 167 is denoted at T. Because the chambered surface is by construction radial of the clutch axis at mean point 80, a plane containing the tangent 166 and tangent to the chamfer surface 43b at mean point 80 will intersect the plane 167 in a radial line, and will intersect the clutch axis 33 in a point of said line, namely, in a point which projects into the point 168, and which has a distance from the drawing plane equal to the mean clutch radius A, namely, the distance 33—76 (Fig. 5). The plane containing tangent 165 and tangent to the tooth side 41b at point 76 is perpendicular to the plane of the drawing and contains the clutch axis.

The said two tangent planes intersect in a line which passes through the point of the clutch axis that projects into point 168 and through point 169 of the drawing plane, and which is inclined at an angle $d$ to the perpendiculars to the drawing plane. We find that:

$$\tan d = \text{distance } \frac{168-169}{A}$$

If we let
$$X = \text{distance } 80-168,$$
then
$$\text{distance } 168-169 = X \tan T$$
and
$$\tan d = \frac{X \tan T}{A}$$

$d$ is the dedendum angle, namely, the angle between the root line of the tooth and the pitch plane and as a result is the inclination of the cutter to the pitch plane. This dedendum angle insures the proper position of the tooth chamfer so that point 80 will be a point of contact between mating chamber surfaces of the engaging clutch members. Point 80 is, however, the only point in a chamfered surface of straight profile, such as the chamfered portion 43b, which fulfills the mathematical condition of contact. I have found, though, that proper contact may be extended over the chamfer portions by using chamfers of convex profile shape. Chamfer surfaces of convex profile shape have other advantages which will appear hereinafter.

Let P denote a point in the convex curve 170 whose every point fulfills the mathematical condition of contact. This condition is simply that the angle $d$ should be the same at all points. Angle $d$ depends on the distance 171–172. 172 is a point on a tangent 173 to the curve 170 at point P, and 171 is the projection of the point P to the tangent 165. Angle $d$ is the same for all points in the curve 170 when distance 171–172 is equal to distance 168–169.

Let $x$ denote the abscissa at point P, namely, the distance P–171, and let $y$ denote the ordinate of the point P, namely the distance 168–171. Let $t$ denote the angle 171–P–172, and let X = distance 80–168, as before. Then, $$\text{distance } 171-172 = x \tan t = X \tan T$$

$$\tan t = \frac{dy}{dx}$$

and $$x \frac{dy}{dx} = X \tan T$$

and $$dy = (X \tan T) \cdot \frac{dx}{x}$$

By integration, we obtain:

$$y = (X \tan T) \cdot \log_e \frac{x}{X}$$

We are interested primarily in the radius of curvature $Rx$ at mean point 80. The general formula for the radius of curvature is:

$$Rx = \frac{1}{\cos^3 t} \cdot \frac{d^2y}{dx^2}$$

Now:

$$\frac{dy}{dx} = \frac{(X \tan T)}{x}$$

Hence:

$$\frac{d^2y}{dx^2} = -\frac{(X \tan T)}{x^2}$$

The absolute amount of $Rx$ is then:

$$Rx = \frac{1}{\cos^3 t} \cdot \frac{x^2}{X \tan T}$$

If $x = X$, then:

$$Rx = \frac{X}{\cos^2 T \cdot \sin T}$$

Figure 13:
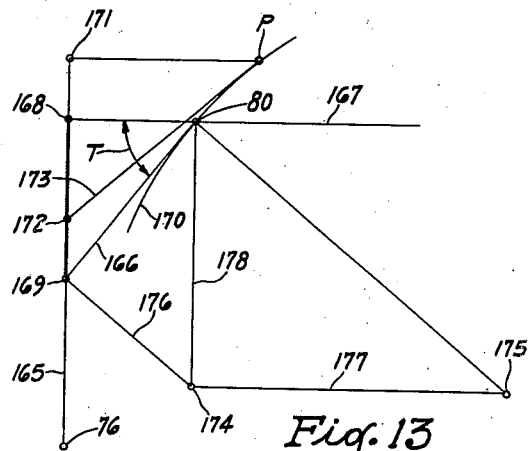
Fig. 13 is a diagrammatic view illustrating the principle on which the present invention is based and showing further why a convex chamfer may be superior to a chamfered surface which is of straight profile.

In Fig. 13, the distance $$80-169 = \frac{X}{\cos T}$$

and the distance $$80-174 = \text{the distance } \frac{80-169}{\sin T}$$

where the angle 80–169–174 is a right angle.

If the angle 80–174–175 is also a right angle, then:

$$\text{distance } (80-175) = \frac{\text{distance } (80-174)}{\cos T}$$

$$= \frac{\text{distance } (80-169)}{\sin T \cos T}$$

$$= \frac{X}{\cos^2 T \sin T}$$

$$Rx = \text{distance } (80-175)$$

The curvature radius at mean point 80 may therefore be obtained by drawing line 176 perpendicular to tangent 166 through the intersection point 169 of said tangent with tangent 165, and by drawing line 177 parallel to line 167 through point 174 on line 176 which is parallel to line 165. It will be seen, therefore, that by making the chamfer of suitable convex shape 170, contact between the chamfered portions of mating clutch members may be obtained not only at a mean point 80 in the chamfered surface, but also in any other points desired in the chamfer profile.

Figure 14:
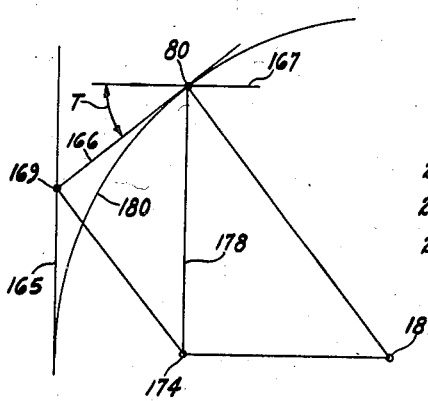
Fig. 14 is a similar view, showing diagrammatically a modified form of convex chamfered surface.

Fig. 14 illustrates a case where the curvature circle 180 of the convex chamfered portion of a tooth just touches the tangent 165 to the side profile of the tooth. This occurs when the angle T equals 38° 10' and constitutes a convenient chamfering radius. The center of the circle 180 is at 181.

Figure 15:
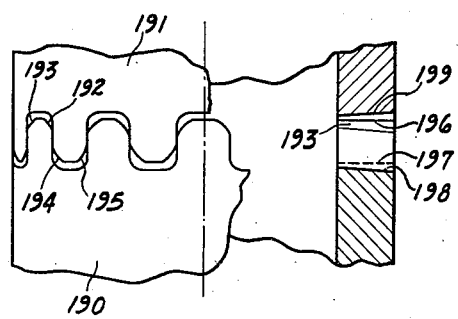
Fig. 15 is a part elevational, part sectional view on an enlarged scale of a pair of clutch members made according to one embodiment of this invention and having chamfered portions of convex profile shape.

Fig. 15 shows a pair of clutch members 190 and 191 in engagement. These clutch members are like the clutch members 30 and 31 of Figs. 1 to 6 inclusive except that they have convex chamfered portions. The chamfered portions at opposite sides of the teeth of one member are denoted at 192 and 193, respectively, while the chamfered portions at the mating sides of the teeth of the other clutch member are denoted at 194 and 195, respectively. The clutch members 190 and 191 have plane top surfaces designated at 196 and 197, respectively, and tapered root surfaces 198 and 199, respectively. The chamfered portions of the teeth increase in width from the inner to the outer ends of the teeth on both members. Mating chamfered portions can be made to contact along their whole lengths or along so much of the length of the teeth as may be desired.

Figure 16:
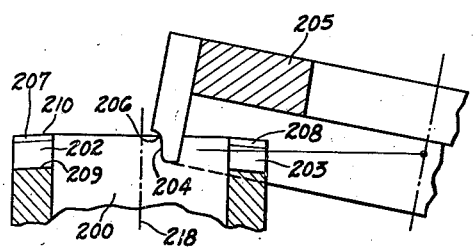
Fig. 16 is a fragmentary axial sectional view through cutter and clutch member, illustrating more or less diagrammatically the operation of cutting and chamfering simultaneously according to a further modification of the invention the teeth of one member of a clutch pair.
Figure 17:
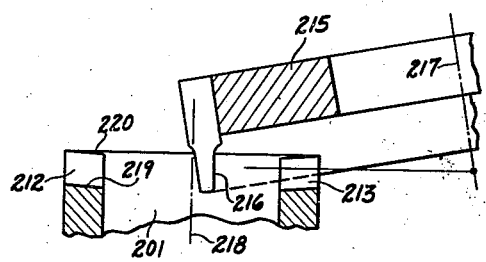
Fig. 17 is a similar view, showing the cutting of the side tooth surfaces of the mating clutch member.
Figure 18:
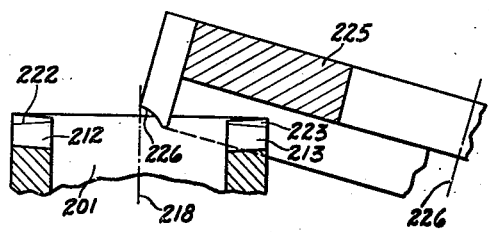
Fig. 18 is a similar view, showing the chamfering of the tooth surfaces of this latter clutch member.

A further modification of the method of producing clutch members according to this invention is illustrated in Figs. 16 to 18 inclusive. One member of the clutch pair is denoted at 200 and the other member at 201. The teeth of the clutch member 200 have sides cut and chamfered with a single cutter and in a single operation. The cutter is denoted at 205. It has an outside cutting edge 204 which is of positive pressure angle and which extends for a part of the effective cutting height of the cutter, which is adapted to cut the side surfaces 202 and 203 of the clutch teeth, and it has a concave cutting edge 206, which is effective for the rest of the effective cutting height of the cutter and which is adapted to cut the chamfered portions 207 and 208 of the clutch teeth. The cutter 205 differs only from the cutter 55 (Fig. 4) by having concavely curved chamfering edges 206 instead of straight chamfering edges 51. The cutter 205 is of a diameter sufficient to cut in two spaced tooth zones of the work simultaneously and is positioned with reference to the clutch member 200 according to the principles described with reference to the cutting of the clutch member 30. Opposite sides of spaced teeth of clutch member 200 are cut and chamfered in a single operation by rotating the cutter 205 on its axis while effecting a relative depthwise feed movement between the cutter and the work.

The tooth sides 202 and 203 are longitudinally concave and of straight profile shape while the chamfered portions 207 and 208 of the clutch teeth are longitudinally concave and of convex profile shape. Because of the tilt of the cutter in the cutting operation, the bottoms 209 of the clutch teeth will be inclined downwardly from the inner ends of the teeth to the outer ends thereof. If it is desired to obtain teeth of uniform height from end to end the clutch member 200 may be provided with a conical top surface 210 parallel to the root surface 209.

While tooth sides and chamfered portions of the clutch member 200 are cut in the same operation, the tooth sides and chamfered portions of the mating clutch member 201 are cut in separate operations. The tooth sides 212 and 213 are cut with a face mill cutter 215 which has inside cutting edges 216 of positive pressure angle but which is so tilted with reference to the clutch blank as to cut side surfaces 212 and 213 of zero pressure angle. The diameter of the cutter 215 is, as before, selected so that the cutter will operate in two spaced tooth zones of the work simultaneously and cut opposite sides of spaced teeth of the work simultaneously as parts of a common conical surface whose axis coincides with the cutter axis 217 and intersects the clutch axis 218. Because of the tilt of the cutter, root lines 219 of negative taper are produced. This taper, however, matches the positive taper of the top surfaces 210 of the clutch member 200. Clutch member 201 can be formed with an internal conical top surface 220 to match the root lines 209 of clutch member 200. It should be noted that the inclination of the root lines of the clutch members is ordinarily quite slight.

The chamfered portions 222 and 223 of the teeth of clutch member 201 are cut by a face mill cutter 225 which has outside cutting edges 226 of concave profile shape. This cutter 225 has its axis 226 inclined to the axis 218 of the clutch member and intersecting that axis. Its diameter is so chosen that it will operate simultaneously in two spaced tooth zones of the work and it is positioned according to the principles already set forth so as to cut chamfer surfaces 222 and 223 on the clutch member 201 which will have the same lengthwise direction as the lengthwise direction of the mating chamfer surfaces 207 and 208 of clutch member 200 at points of contact between the mating chamfer surfaces. The cutter is rotated in engagement with the work and if necessary fed into depth a sufficient distance to produce the chamfer to the desired depth. Then the cutter is withdrawn and the work indexed.

Figure 22:
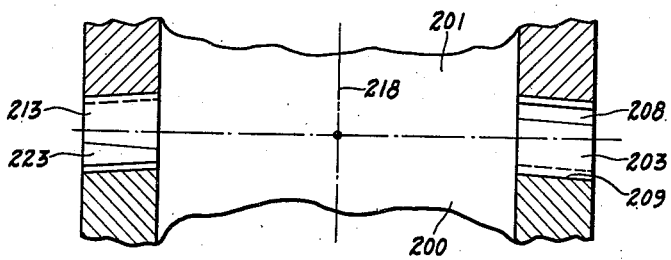
Fig. 22 is an enlarged axial sectional view of a pair of mating clutch members cut and chamfered according to the modification of the invention illustrated in Figs. 16 to 18 inclusive.

The cutter 225 will produce chamfered portions 222 and 223 of convex profile shape but of concave lengthwise shape on the teeth of the clutch member 201, and the chamfered portions of spaced teeth of the clutch member will be parts of a common surface of revolution coaxial with the cutter axis 226. Usually a chamfer is produced which is slightly tapered in height from end to end, as shown in Fig. 18. With a separate chamfering operation, however, it is also possible to produce a correct chamfer which is of uniform width from end to end. Control of the bearing length on the mating chamfered portions of engaging clutch members is attained by varying the number of teeth skipped between the two tooth zones in which the cutter operates. Fig. 22 shows the clutch members 200 and 201 in engagement.

Figure 19:
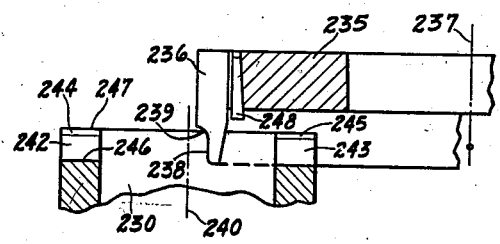
Fig. 19 is a view, correspopnding to Fig. 16, showing the simultaneous cutting and chamfering of the teeth of a clutch member according to a still further embodiment of the invention.
Figure 20:
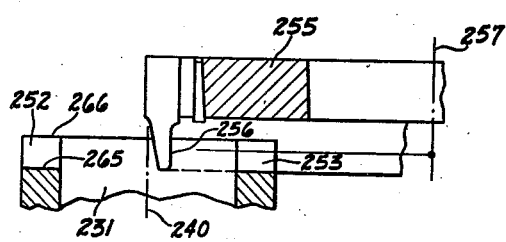
Figs. 20 and 21 are views, corresponding to Figs. 17 and 18, respecptively, showing the cutting and chamfering in separate operations, respectively, of the clutch member which is to engage with the clutch member cut by the process of Fig. 19.
Figure 21:
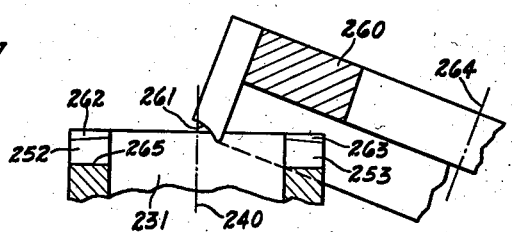

A further modification of the invention is illustrated in Figs. 19 to 21 inclusive. Here the two clutch members are denoted at 230 and 231, respectively. Again one of the clutch members has tooth sides and chamfered portions produced simultaneously, while the other clutch member has its tooth sides cut in one operation and the teeth chamfered in a separate operation. In cutting the member 230, a face mill cutter 235 is used which has a plurality of cutting blades 236 that extend in the direction of its axis 237. These blades have outside finish cutting edges 238 and outside chamfering edges 239. The side-cutting edges 238 are straight and of zero pressure angle and extend for part of the effective cutting height of the cutter. The chamfering edges 239 are of concave shape and extend for the rest of the effective cutting height of the cutter.

The cutter 235 is positioned according to the principles already described and preferably is made of sufficient diameter to cut into spaced tooth zones of the work simultaneously, thus finish-cutting longitudinally concave side tooth surfaces of straight profile and longitudinally concave chamfered portions of convex profile on opposite sides of spaced teeth of the work in a single cutting operation. The cutter is positioned so that its axis 237 is parallel to the axis 240 of the clutch and the cutter is rotated in engagement with the work while the work is held stationary on its axis and while a relative depthwise feed movement is effected between the cutter and work. Then the cutter is withdrawn and the work indexed. Then the cycle is begun anew.

The tooth sides 242 and 243 cut on opposite sides of the teeth of the clutch member 230 are of uniform height from end to end and the chamfered portions 244 and 245 are also of uniform height from end to end. The tooth sides are parts of cylindrical surfaces in contrast with the previously described embodiments of the invention which have conical tooth sides. The root lines 246 of the clutch member lie in a plane perpendicular to the clutch axis and the top surface 247 of the clutch member is also preferably formed to lie in a plane perpendicular to the clutch axis.

Because of the zero pressure angle of the blades 236, they must be relieved, not only axially but also radially, and they require to be adjusted radially of the cutter axis after sharpening. This adjustment may be effected in the conventional manner by adjustment of wedges 248.

The side tooth surfaces 252 and 253 of the mating clutch member 231 are cut with a face mill cutter 255 which has inside cutting edges 256 of straight profile and zero pressure angle. This cutter is positioned according to the principles previously described. Its diameter is preferably so chosen as to cut in two spaced tooth zones of the work simultaneously. Its axis 257 is placed parallel to the clutch axis 240 in order to cut cylindrical side tooth surfaces on clutch member 231 which will engage with the cylindrical tooth surfaces of clutch member 230. The cutter is rotated in engagement with the work while a relative depthwise feed movement is effected between the cutter and work to cut opposite sides of spaced teeth of the work simultaneously. These sides will be longitudinally convex.

The teeth of clutch member 231 are chamfered by a cutter 260 which has outside cutting edges 261 of concave shape. The cutter is positioned so that its axis 264 intersects the axis 240 of the work and the cutter is of such diameter as to operate in two spaced tooth zones of the work simultaneously. The chamfered portions 262 and 263 of the teeth of clutch member 231 are produced, as before, by rotating the cutter in engagement with the work and effecting such depthwise feed movement as may be required to cut the chamfered portions for their full height. It will be noted that the chamfered portions 262 and 263 increase in width from the inner ends to the outer ends of the teeth. They are of longitudinally concave shape and of convex profile shape and the chamfer surfaces at opposite sides of spaced teeth are parts of a common surface of revolution whose axis coincides with the cutter axis.

Figure 23:
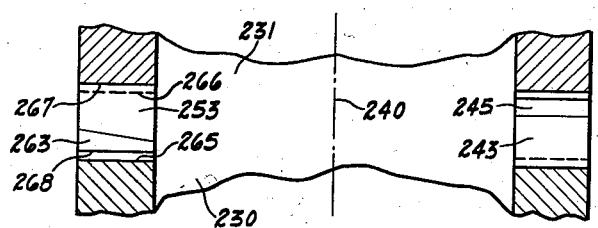
Fig. 23 is an enlarged axial sectional view of a pair of clutch members cut and chamfered according to the modification of the invention illustrated in Figs. 19 to 21 inclusive.

The two clutch members 230 and 231 are shown on an enlarged scale in engagement in Fig. 23. It will be noted that the root lines 265 and the top surfaces 266 of clutch member 230 and the root lines 267 and top surfaces 268 of clutch member 231 are plane surfaces perpendicular to the clutch axis 240.

In the case of the clutch members 200 and 230, opposite sides of spaced teeth and the chamfered portions of these sides are counterparts of the cutting surfaces of the cutters 205 and 235, respectively, that is, they are portions of concentric surfaces of revolution. In the case of the mating clutch members 201 and 231, opposite sides of spaced teeth are portions of concentric surfaces of revolution, and the chamfered portions of opposite sides of spaced teeth are portions of other concentric surfaces of revolution, whose axes are inclined to the axes of the first named surfaces.

The method of the present invention is applicable to grinding as well as to cutting, and grinding may be effected either with a grinding wheel of annular form shaped like the face mill cutter, or with an oscillatory cup-shaped wheel, which is rotated on its axis and simultaneously oscillated to produce the desired lengthwise tooth shape. Where the cup-shaped wheel is used, the angle of oscillation of the wheel is preferably made large enough so that the wheel grinds opposite sides of spaced teeth simultaneously, and thereby achieves the same effect as would be achieved with an annular wheel operating in two spaced tooth zones of the work. In grinding, wheels of positive pressure angle are preferably used. When the terms "cutter" and "cutting" are used hereinafter in the claims it will be understood that they are intended to include grinding wheels and grinding operations.

In general it may be said that while the invention has been described in connection with several embodiments thereof, it is capable of still further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A toothed face clutch member whose teeth have longitudinally curved side surfaces and are chamfered along their top edges, side surfaces of teeth and chamfered portions of teeth being coaxial surfaces of revolution whose axes are inclined to the clutch axis.

2. A toothed face clutch member whose teeth have longitudinally curved side surfaces and are chamfered along their top edges, the side surface of a tooth and the chamfered portion at the same side of the tooth being coaxial surfaces of revolution whose axis intersects the clutch axis.

3. A toothed face clutch member whose teeth have longitudinally curved side surfaces and are chamfered along their top edges, the side surfaces of the teeth and the chamfered portions of the teeth being parts of surfaces of revolution, the chamfered portion at one side of a tooth space being part of a surface of revolution coaxial with the side tooth surface at the opposite side of that tooth space.

4. A toothed face clutch member whose teeth have longitudinally curved side surfaces and are chamfered along their top edges, the side surfaces of the teeth and the chamfered portions of the teeth being parts of surfaces of revolution, the chamfered portion at one side of a tooth being part of a surface of revolution coaxial with the opposite side surface of the tooth.

5. A toothed face clutch member whose teeth have longitudinally curved side surfaces and are chamfered along their top edges, chamfered portions and side surfaces of teeth being radial of the clutch axis at mean points in their length and being parts of coaxial surfaces of revolution whose axes intersect the clutch axis.

6. A toothed face clutch member whose teeth have longitudinally curved side surfaces and are chamfered along their top edges, the chamfered portions of the teeth being parts of surfaces of revolution of convex profile shape and at mean points in their lengths being radial of the clutch axis, the sides of the teeth being also parts of surfaces of revolution and radial of the clutch axis at the same radial distance from the clutch axis, a chamfered portion of a tooth being a surface of revolution coaxial with a tooth side.

7. A pair of toothed face clutch members, each of which has teeth that have longitudinally curved side surfaces and are chamfered along their top edges, and each of which has tooth sides that are surfaces of revolution coaxial with surfaces of revolution containing the chamfered portions of the teeth, the contacting tooth sides and the contacting chamfered portions of the two clutch members having the same lengthwise direction at mean points in their length.

8. A pair of toothed face clutch members, each of which has teeth that have longitudinally curved side surfaces and are chamfered along their top edges, and each of which has tooth sides that are surfaces of revolution coaxial with surfaces of revolution containing the chamfered portions of its teeth, the sides and chamfered portions of the teeth of both clutch members extending radially of the clutch axis at mean points in their length.

9. A toothed face clutch member whose teeth have longitudinally curved side surfaces of zero pressure angle and are chamfered along their top edges, opposite sides of spaced teeth being parts of a common surface of revolution, and the chamfered portions at opposite sides of spaced teeth being parts of a common surface of revolution which is coaxial with the first named surface of revolution and whose axis intersects the clutch axis.

10. A toothed face clutch member whose teeth have longitudinally curved side surfaces and are chamfered along their top edges, opposite sides of spaced teeth being parts of a common surface of revolution, and the chamfered portions at those same opposite sides of spaced teeth being parts of a common surface of revolution which is coaxial with the first named surface of revolution and whose axis intersects the clutch axis.

11. A toothed face clutch member whose teeth have longitudinally curved side surfaces and are chamfered along their top edges, opposite sides of spaced teeth being parts of a common surface of revolution, the chamfered portions at opposite sides of spaced teeth being also parts of a common surface of revolution, the chamfered portion at one side of a tooth being a part of a surface of revolution coaxial with the surface of revolution containing the opposite side of that tooth.

12. A toothed face clutch member whose teeth have longitudinally curved side surfaces and are chamfered along their top edges, opposite sides of spaced teeth being parts of a common surface of revolution, the chamfered portions at opposite sides of spaced teeth being also parts of a common surface of revolution, the chamfered portion at one side of a tooth space being part of a surface of revolution coaxial with the surface of revolution containing the opposite side of that tooth space.

13. A toothed face clutch member whose teeth have longitudinally curved side surfaces and are chamfered along their top edges, opposite sides of spaced teeth being parts of a common conical surface of revolution of zero pressure angle whose axis is inclined to the clutch axis, and the chamfered portions at said same sides of the teeth being parts of a common surface of revolution which is inclined to the first named conical surface but which is coaxial therewith.

14. A pair of toothed face clutch members, each of which has teeth that have longitudinally curved side surfaces and that are chamfered along their top edges, the side tooth surfaces of each of said members being parts of surfaces of revolution, and the chamfered portions of each of said members being parts of surfaces of revolution, one member, at least, having chamfered portions which are coaxial with side surfaces of its teeth, and the contacting chamfered portions of both members having the same lengthwise direction at corresponding mean points.

15. A pair of toothed face clutch members, each of which has teeth that have longitudinally curved side surfaces and that are chamfered along their top edges, the side tooth surfaces of each of said members being parts of surfaces of revolution, and the chamfered portions of each of said members being parts of surfaces of revolution, one member, at least, having chamfered portions which are coaxial with sides of its teeth, the chamfered portions and sides of the teeth of both members being radial of the clutch axis at corresponding mean points in the length of said chamfered portions and tooth sides.

16. A pair of toothed face clutch members, each of which has teeth that have longitudinally curved side surfaces and that are chamfered along their top edges, the side tooth surfaces of each of said members being parts of surfaces of revolution, and the chamfered portions of each of said members being parts of surfaces of revolution, one member having chamfered portions and side surfaces which are parts of coaxial surfaces of revolution, the chamfered portions of the other member being parts of surfaces of revolution whose axes are inclined to the axes of the side tooth surfaces of said other member, the contacting chamfered portions of both members having the same lengthwise direction at corresponding mean points.

17. A pair of toothed face clutch members, each of which has teeth that have longitudinally curved side surfaces and that are chamfered along their top edges, the side surfaces of each of said members being parts of surfaces of revolution, and the chamfered portions of each of said members being parts of surfaces of revolution, one member having chamfered portions and side surfaces which are parts of coaxial surfaces of revolution, the chamfered portions of the other member being parts of surfaces of revolution whose axes are inclined to the axes of the side tooth surfaces of said other member, the chamfered portions and side tooth surfaces of both members extending radially of the clutch axis at corresponding mean points in the length of the chamfered portions and tooth sides.

18. A toothed face clutch member having teeth that are chamfered along their top edges, the sides of said teeth being parts of surfaces of revolution of zero pressure angle and the chamfered portions of the teeth being parts of surfaces of revolution coaxial with the sides of the teeth, the axes of said chamfered portions intersecting the clutch axis.

19. A pair of toothed face clutch members, each of which has teeth whose sides are longitudinally curved and that are chamfered along their top edges, the tooth sides and chamfered portions of one member being parts of coaxial surfaces of revolution whose axis is parallel to the clutch axis, and the sides and chamfered portions of the teeth of both members having the same lengthwise direction at corresponding mean points.

20. A toothed face clutch member whose teeth have longitudinally curved side surfaces and are chamfered along their top edges, opposite side surfaces of spaced teeth being parts of a common surface of revolution, and the chamfered portions at opposite sides of spaced teeth being parts of a common surface of revolution, the axes of both the side surfaces and the chamfered portions of the teeth being inclined to the clutch axis.

21. A toothed face clutch member whose teeth have longitudinally curved side surfaces and are chamfered along their top edges, opposite side surfaces of spaced teeth being parts of a common surface of revolution, and the chamfered portions at opposite sides of spaced teeth being parts of a common surface of revolution, the axes of the side surfaces of the teeth and of the chamfered portions being inclined to one another and to the clutch axis and intersecting the clutch axis.

22. A toothed face clutch member whose teeth have longitudinally curved side surfaces and are chamfered along their top edges, opposite side surfaces of spaced teeth being parts of a common conical surface of zero pressure angle, and the chamfered portions at opposite sides of spaced teeth being parts of a common surface of revolution, the axes of the side surfaces and of the chamfered portions being inclined to the clutch axis and to one another and intersecting the clutch axis.

23. A toothed face clutch member whose teeth have longitudinally curved side surfaces and are chamfered along their top edges, both the chamfered portions and the side surfaces of the teeth being radial of the clutch axis at the mean points in their lengths and being parts of coaxial surfaces of revolution whose axes intersect the clutch axis, opposite sides of spaced teeth being parts of a common surface of revolution, and the chamfered portions at opposite sides of spaced teeth being parts of a common surface of revolution.

24. A toothed face clutch member whose teeth have longitudinally curved side surfaces and are chamfered along their top edges, the chamfered portions of the teeth being parts of surfaces of revolution of convex profile shape and at mean points in their lengths being radial of the clutch axis, the sides of the teeth being also parts of surfaces of revolution and radial of the clutch axis at the same mean radial distance from the clutch axis, a chamfered portion of a tooth being a surface of revolution coaxial with a tooth side, the chamfered portions at opposite sides of spaced teeth being parts of a common surface of revolution, and opposite sides of spaced teeth being parts of a common surface of revolution.

25. A pair of toothed face clutch members, each of which has longitudinally curved teeth that are chamfered along their top edges, and each of which has tooth sides that are surfaces of revolution coaxial with surfaces of revolution containing the chamfered portions of the teeth, the contacting tooth sides and the contacting chamfered portions of the two clutch members having the same lengthwise direction at mean points in their lengths, opposite sides of spaced teeth being parts of a common surface of revolution, and the chamfered portions at opposite sides of spaced teeth being parts of a common surface of revolution.

ERNEST WILDHABER.